US008867689B2

(12) United States Patent
Houghton et al.

(10) Patent No.: US 8,867,689 B2
(45) Date of Patent: Oct. 21, 2014

(54) HEAT REMOVAL SYSTEM AND METHOD FOR USE WITH A NUCLEAR REACTOR

(75) Inventors: Zach James Houghton, Salem, OR (US); Richard Biasca, Corvallis, OR (US); Jonathan James Arthur, Corvallis, OR (US); Colin Maxwell Sexton, Corvallis, OR (US); John Harold Matonic, Los Alamos, NM (US); Maurice Andrew La Fountain, Albany, OR (US)

(73) Assignee: NuScale Power, LLC, Corvallis, OR (US)

( * ) Notice: Subject to any disclaimer, the term of this patent is extended or adjusted under 35 U.S.C. 154(b) by 643 days.

(21) Appl. No.: 13/303,408

(22) Filed: Nov. 23, 2011

(65) Prior Publication Data
US 2012/0207260 A1 Aug. 16, 2012

Related U.S. Application Data

(60) Provisional application No. 61/463,282, filed on Feb. 15, 2011.

(51) Int. Cl.
*G21C 7/32* (2006.01)
*G21C 15/12* (2006.01)
*G21D 1/02* (2006.01)
*G21C 1/32* (2006.01)
*G21C 17/022* (2006.01)

(52) U.S. Cl.
CPC ............... *G21C 15/12* (2013.01); *G21C 1/322* (2013.01); *G21D 1/02* (2013.01); *G21C 17/022* (2013.01); *Y02E 30/40* (2013.01)
USPC .......................................... 376/210; 376/282

(58) Field of Classification Search
CPC ...... G21C 15/12; G21C 1/322; G21C 17/022; Y02E 30/40
USPC .................................................... 376/210, 282
See application file for complete search history.

(56) References Cited

U.S. PATENT DOCUMENTS

| 5,011,652 | A | * | 4/1991 | Tominaga et al. | 376/283 |
|---|---|---|---|---|---|
| 5,761,262 | A | * | 6/1998 | No et al. | 376/298 |
| 6,249,561 | B1 | | 6/2001 | Aburomia | |
| 7,558,360 | B1 | * | 7/2009 | Gamble et al. | 376/280 |
| 8,542,792 | B1 | * | 9/2013 | Young et al. | 376/377 |
| 8,559,583 | B1 | | 10/2013 | Sato et al. | |
| 2004/0105518 | A1 | * | 6/2004 | Abel et al. | 376/210 |
| 2009/0129530 | A1 | | 5/2009 | Reyes | |
| 2009/0161812 | A1 | * | 6/2009 | Reyes et al. | 376/277 |
| 2010/0111242 | A1 | * | 5/2010 | Helmersson et al. | 376/210 |

OTHER PUBLICATIONS

Officer Yong Hoon Kim, International Search Report and Written Opinion dated Sep. 19, 2012 for PCT/US2012/025001, 9 pages.
Officer Kihwan Moon, International Preliminary Report on Patentability dated Aug. 29, 2013 for PCT/US2012/025001, 6 pages.
Dr. Jose N. Reyes, Jr., "NuScale Power Introduction to NuScale Design" U.S. Nuclear Regulatory Commission Pre-Application Meeting, Rockville, MD, Jul. 24, 2008 (26 pages).

* cited by examiner

*Primary Examiner* — Timothy A Brainard
(74) *Attorney, Agent, or Firm* — Fish & Richardson P.C.

(57) ABSTRACT

A nuclear reactor includes a reactor vessel, a containment vessel that surrounds the reactor vessel, and a condenser that receives coolant from within the reactor vessel. The containment vessel and the condenser are at least partially submerged within a common reactor pool of liquid.

31 Claims, 5 Drawing Sheets

HEAT REMOVAL SYSTEM AND METHOD FOR USE WITH A NUCLEAR REACTOR

CROSS-REFERENCE TO RELATED APPLICATION

This application claims priority under 35 U.S.C. §119(e) from U.S. provisional patent application No. 61/463,282, filed Feb. 15, 2011, the entire contents of which are incorporated herein by reference.

BACKGROUND

In a nuclear reactor, a core of nuclear material is confined to a small volume internal to the reactor so that a reaction may occur. In many instances, a controlled nuclear reaction may persist for an extended period of time, which may include several years before refueling of the nuclear core is required. Accordingly, when used as a source of heat for converting large quantities of water into steam, a properly designed nuclear reactor may provide a carbon-free, stable, and highly reliable source of energy.

When two or more nuclear reactors are situated at a reactor site, stability and reliability of energy output may be increased. In such an arrangement, while a first reactor may be off-line for refueling, maintenance, repair, or the like, a second reactor may continue to function at its rated output power level. As additional reactors are integrated at the reactor site, stability and reliability of energy output may be further enhanced.

In addition to multiple reactor units as a means for providing a steady flow of output power, individual nuclear reactor units operating at a site may each be designed in a manner that promotes a high level of safety in addition to enhanced reliability. For example, a reactor unit may incorporate features that provide protection during and after the occurrence of events that may degrade a primary cooling system of the nuclear reactor. When such an event occurs, a decay heat removal system may be employed to ensure that the particular reactor remains in a stable condition.

SUMMARY

In an embodiment, a nuclear reactor includes a reactor vessel, a containment vessel that surrounds the reactor vessel, and a first condenser that receives coolant from within the reactor vessel, wherein the containment vessel and the first condenser are at least partially submerged within a common pool.

In another embodiment, a method of removing heat from a nuclear reactor includes actuating a control device and conveying, responsive to actuation of the control device, vaporized coolant through a condenser, wherein the condenser and a containment vessel of the nuclear reactor are at least partially submerged in a common pool, and wherein the condenser and the containment vessel are in direct contact with liquid of the common pool.

In another embodiment, a method of configuring a nuclear reactor and associated condenser for use includes coupling, structurally or fluidically, the condenser to the nuclear reactor, and at least partially submerging the condenser and the nuclear reactor into a common pool of liquid, wherein the at least partially submerged condenser makes direct contact with liquid of the common pool.

In another embodiment, a heat removal system includes a condenser operable to remove heat from a nuclear reactor, wherein the condenser is at least partially submerged in a pool of liquid surrounding the nuclear reactor. The system also includes means for detecting a degradation in cooling capability of the nuclear reactor and means for controlling vaporized coolant flow to the condenser in response to an output signal from the means for detecting a degradation in cooling capability.

BRIEF DESCRIPTION OF THE DRAWINGS

Non-limiting and non-exhaustive aspects are described with reference to the following figures, wherein like reference numerals refer to like parts throughout the various figures.

DETAILED DESCRIPTION

Figure 1:
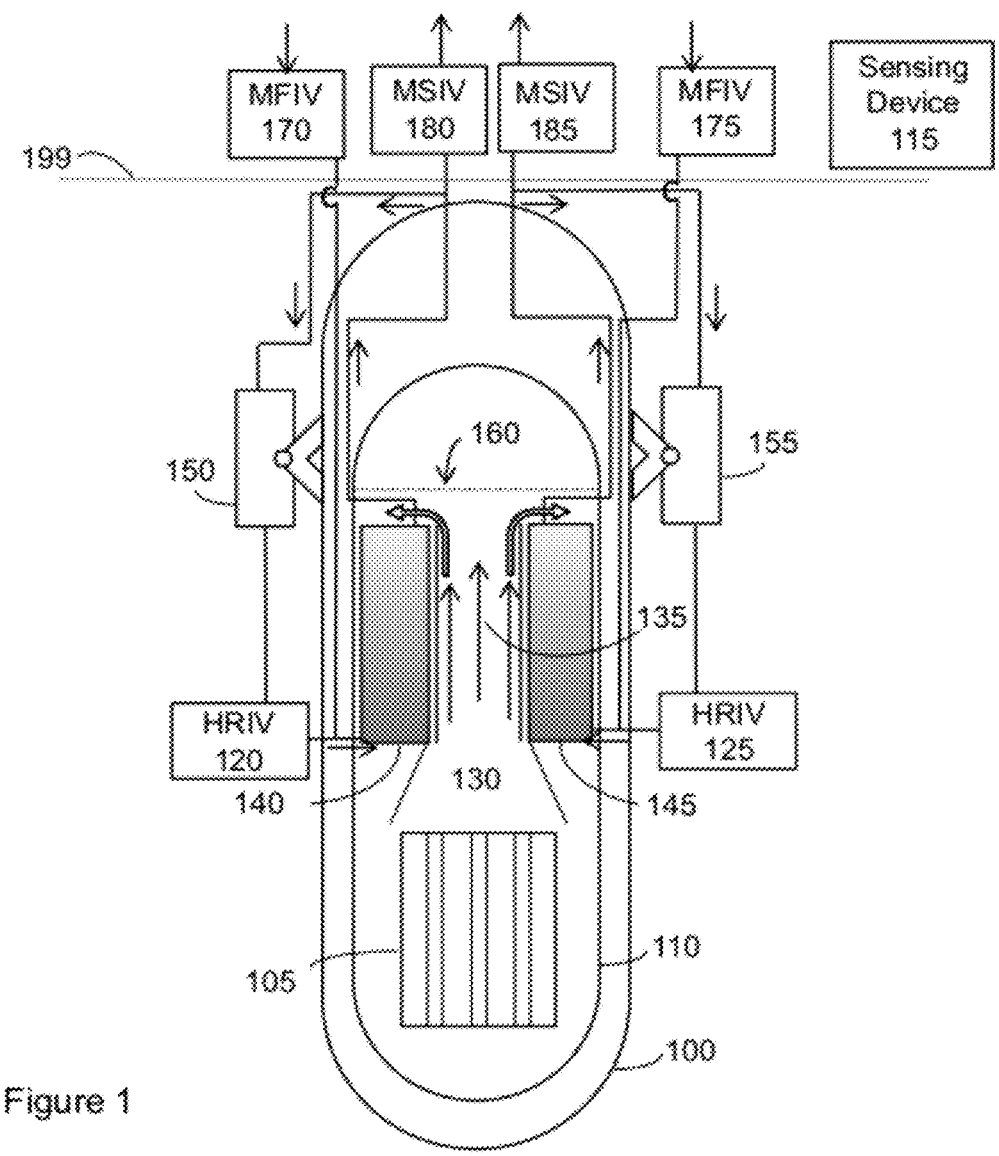
FIG. 1 is a diagram of a nuclear reactor employing a heat removal system according to a first implementation.

Methods and systems for removing heat from a nuclear reactor are described. In one implementation, a condenser is structurally coupled (e.g. affixed, mounted, fastened, welded, etc.) to a containment vessel and at least partially submerged in water in a reactor bay. The condenser and containment vessel may then be transported with the reactor as the reactor is lifted from the reactor bay and placed on a service fixture. Thus, even if the reactor is removed from a water-filled reactor bay, the condenser may continue to provide a capability to remove excess heat generated within the reactor vessel.

In another implementation, a heat-removing condenser is structurally coupled to an interior surface (e.g. a wall, a floor, or other interior portion) of a structure that defines the shape of the reactor pool. As such, the condenser and the reactor may be partially or fully submerged within a common pool of liquid that serves as a heat sink for both the condenser and the reactor. In an example, the condenser and the reactor are fluidically coupled by way of piping or other conduits that allow liquid and/or vapor to flow between the condenser and the reactor. Prior to removal from the reactor bay, the condenser may be decoupled from the reactor.

As used herein and as described in greater detail in subsequent sections, embodiments of the invention may include various nuclear reactor technologies. Thus, some implementations may include reactor technologies that employ pressurized water, which may include boron and/or other chemicals or compounds, boiling water, liquid metal cooling, gas cooling, molten salt cooling, and/or other cooling methods. Implementations may also include nuclear reactors that employ uranium oxides, uranium hydrides, uranium nitrides, uranium carbides, mixed oxides, and/or other types of radioactive fuel. It should be noted that embodiments are not limited to any particular type of reactor cooling mechanism, nor to any particular type of fuel employed to produce heat within or associated with a nuclear reaction.

In some implementations, a signal present at an input port of a control device is actuated to permit coolant to flow from a heat exchanger within a reactor vessel to a condenser structurally coupled to a containment vessel or to a condenser structurally coupled to an internal surface of a reactor bay that defines the shape of the pool. A control device may be actuated, at least in part, as a result of a signal at an input port from an output port of a degradation sensor that detects of a degradation in nominal cooling capability. A degradation in cooling capability may be brought about by a loss of feedwater, a loss of off-site power, a failure within a coolant pump, a break in a pipe or other conduit carrying feedwater, a loss of a feedwater heater, or any other cooling-related event that impedes, degrades, or diminishes flow of coolant to a reactor core.

In particular implementations, for example, vaporized coolant is conveyed from a heat exchanger to a condenser at least partially submerged in a pool of liquid in which a nuclear reactor may also be at least partially submerged. A liquid comprising the reactor pool may be in direct contact with a containment vessel that surrounds a reactor vessel and also in direct contact with an at least partially submerged condenser. Vaporized coolant at an elevated temperature may be condensed by way of the exchange of heat between the condenser and the liquid comprising the reactor pool.

FIG. 1 is a diagram of a nuclear reactor employing a heat removal system according to a first implementation. In FIG. 1, reactor core 105 is positioned at a bottom portion of a cylinder-shaped or capsule-shaped reactor vessel 110. Reactor core 105 comprises a quantity of fissile material that generates a controlled reaction that may occur over a period of perhaps several years. Although not shown explicitly in FIG. 1, control rods may be employed to control the rate of fission within reactor core 105. Control rods may comprise silver, indium, cadmium, boron, cobalt, hafnium, dysprosium, gadolinium, samarium, erbium, and europium, or their alloys and compounds. However, these are merely a few of many possible control rod materials In implementations, a cylinder-shaped or capsule-shaped containment vessel 100 surrounds reactor vessel 110 and is partially or completely submerged within a reactor pool, such as below waterline 199. The volume between reactor vessel 110 and containment vessel 100 may be partially or completely evacuated to reduce heat transfer from reactor vessel 110 to the reactor pool. However, in other embodiments, the volume between reactor vessel 110 and containment vessel 100 may be at least partially filled with a gas and/or a liquid that increases heat transfer between the reactor and containment vessels.

In a particular implementation, reactor core 105 is submerged within a liquid, such as water, which may include boron or other additive, which rises into channel 130 after making contact with a surface of the reactor core. In FIG. 1, the upward motion of heated coolant is represented by arrows 135 within channel 130. The coolant travels over the top of heat exchangers 140 and 145 and is pulled downward by way of convection along the inner walls of reactor vessel 110, thus allowing the coolant to impart heat to heat exchangers 140 and 145. After reaching a bottom portion of the reactor vessel, contact with reactor core 105 results in heating the coolant, which again rises through channel 130.

Although heat exchangers 140 and 145 are shown as two distinct elements in FIG. 1, heat exchangers 140 and 145 may represent a number of helical coils that wrap around channel 130. In another implementation, another number of helical coils may wrap around channel 130 in an opposite direction, in which, for example, a first helical coil wraps helically in a counterclockwise direction, while a second helical coil wraps helically in a clockwise direction. However, nothing prevents the use of differently-configured and/or differently-oriented heat exchangers and embodiments are not limited in this regard. Further, although water line 160 is shown as being positioned just above upper portions of heat exchangers 140 and 145, in other implementations, reactor vessel 110 may include a lesser or greater amounts of water.

In FIG. 1, normal operation of the nuclear reactor proceeds in a manner wherein heated coolant rises through channel 130 and makes contact with heat exchangers 140 and 145. After contacting heat exchangers 140 and 145, the coolant sinks towards the bottom of reactor vessel 110 in a manner that induces a thermal siphoning process. In the example of FIG. 1, coolant within reactor vessel 110 remains at a pressure above atmospheric pressure, thus allowing the coolant to maintain a high temperature without vaporizing (i.e. boiling).

As coolant within heat exchangers 140 and 145 increases in temperature, the coolant may begin to boil. As boiling commences, vaporized coolant is routed through main steam isolation valve (MSIV) 180 and MSIV 185. Vaporized coolant, such as steam, may be used to drive one or more turbines that convert the thermal potential energy of steam into electrical energy. After condensing, coolant is returned to heat exchangers 140 and 145 by way of control devices such as main feed isolation valve (MFIV) 170 and MFIV 175, respectively. In the example of FIG. 1, heat removal isolation valves (HRIV) 120 and HRIV 125 and/or MSIV 180 and 185 maintain condensers 150 and 155 in a relatively isolated condition in which neither steam nor water are conveyed to the condensers. In an example, condensers 150 and 155 are structurally coupled to containment vessel 100.

MFIVs 180 and 185, MFIVs 170 and 175, and HRIVs 120 and 125 represent any one of several types of control devices that, responsive to a signal at an input port, function to connect an input port to an output port in response to a received signal. For example, degradation sensor 115 may generate a signal at an output port responsive to detecting a pressure drop at an input port and/or an output port of MSIV 180 or 185 or a pressure drop at an input and/or an output of MFIVs 170 and 175 that meets certain criteria. However, in other implementations, control devices (e.g. MFIVs, MFIVs, and HRIVs) may actuate as a result of other stimuli present at an input port of the device.

In the example of FIG. 1, a degradation sensor 115 generates a signal at an output port that identifies the occurrence of a cooling-related event, which may include a loss of feedwater, a loss of off-site power, a failure within a coolant pump, a break in a pipe or other conduit carrying feedwater, a loss of a feedwater heater, or any other event that impedes, degrades, or diminishes flow of coolant to a steam generator within a reactor vessel. As a result, one or more of MFIVs 180 and 185 and/or MFIVs 170 and 175 adjust to isolate one or more of condensers 150 and 155. In addition, a signal from an output port of degradation sensor 115 results in HRIVs 120 and 125 adjust to permit flow through condensers 150 and 155. However, in other examples, one or more of MFIVs 180 and 185, and/or MFIVs 170 and 175, and/or HRIV 120 and 125 may adjust as a result of other conditions.

Figure 2A:
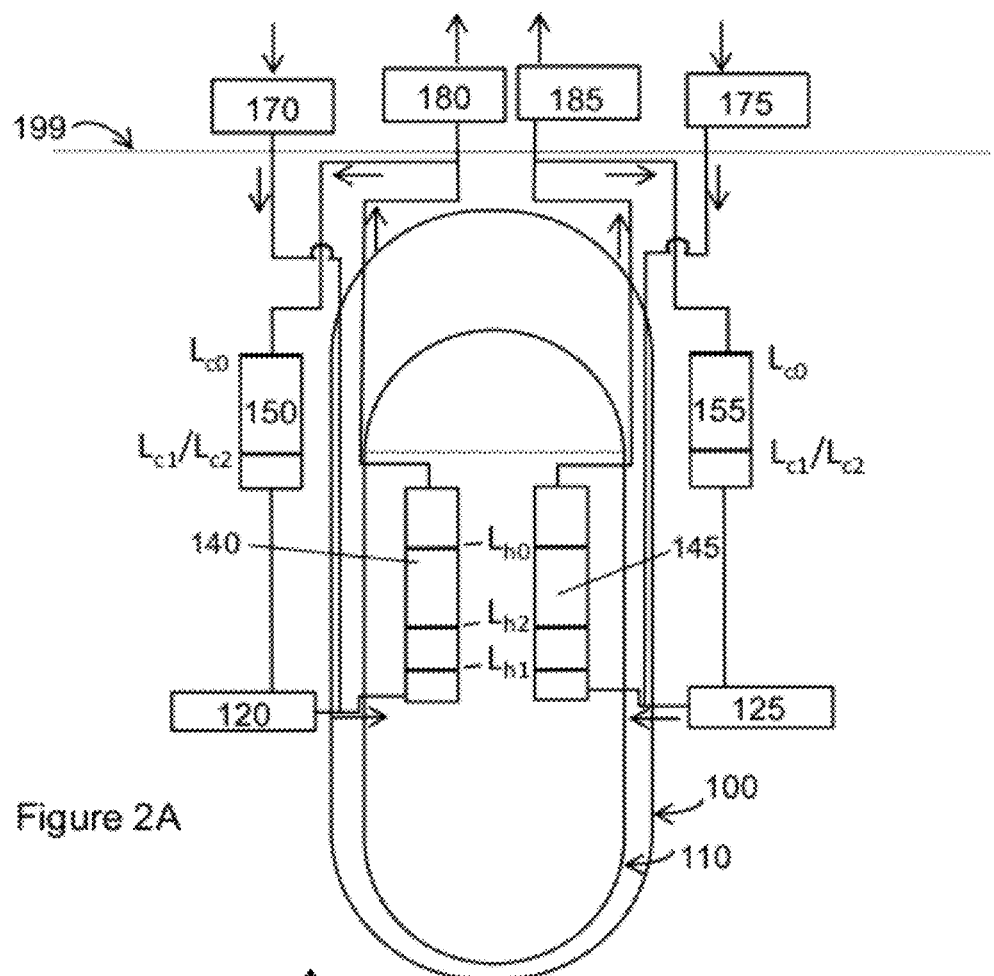
FIG. 2A shows a portion of the nuclear reactor of FIG. 1 along with a plot of condenser input pressure as a function of time in FIG. 2B.
Figure 2B:
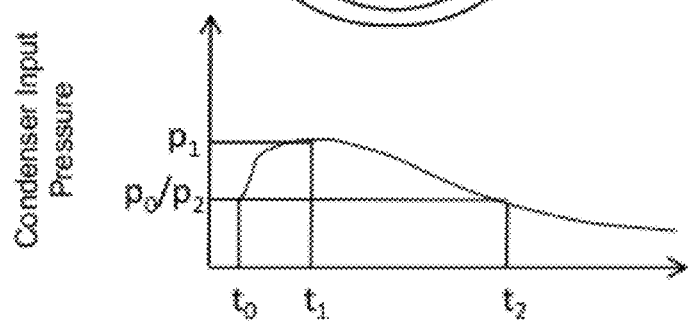

FIG. 2A shows a portion of the nuclear reactor of FIG. 1 along with a plot of condenser input pressure as a function of time in FIG. 2B. In FIG. 2A, various portions of the nuclear reactor of FIG. 1 have been removed or reduced in size so as to clarify the operative portions of the reactor. A time $t_0$, shown in FIG. 2B, represents a time prior to the occurrence of a cooling-related event. Thus, pressure at an input port to condenser 150 and/or 155 may be represented as $p_0$, and corresponds to a normal or steady-state pressure. At time $t_0$, heat exchangers 140 and 145 include liquid coolant at a level of $L_{h0}$, as shown in FIG. 2A. A level of liquid coolant present in condensers 150 and 155 may be represented as $L_{c0}$, also at time $t_0$. It should be noted that in some implementations, the level of coolant at time $t_0$ may increase to a level even greater than $L_{c0}$, perhaps to a level that is proximate with waterline 199 of FIG. 2.

In the example of FIG. 2A, if a cooling-related event occurs, MSIV 180 may close in a manner that blocks the vaporized coolant from the heat exchanger. A cooling-related event may also result in MFIV 170 closing and HRIV 120 switching so that coolant from an output port of condenser 150 is allowed to flow to an input port of heat exchanger 140 within reactor vessel 110. A cooling-related event results in MSIV 185 closing, which results in allowing coolant to flow from an output port of heat exchanger 145 to an input port of condenser 155. The cooling-related event may also result in the switching of HRIV 125, which allows coolant from an output port of a condenser 155 to flow to an input port of heat exchanger 145.

In an example, at a time $t_1$, which corresponds to a time after the occurrence of a cooling-related event, a level of liquid coolant, present in heat exchangers 140 and 145, decreases from a relatively high level, such as $L_{h0}$, to a relatively low level, which is represented as $L_{h1}$. As a relatively large amount of coolant is converted from a liquid phase to a vapor phase, pressure within the heat exchangers and at input ports of condensers 150 and 155 increases to a level of $p_1$ shown in FIG. 2B. As vaporized coolant under an increased pressure from heat exchangers 140 and 145 is allowed to flow to input ports of condensers 150 and 155, at least some liquid coolant is driven from condensers 150 and 155, thus reducing a level of liquid coolant from $L_{c0}$ to $L_{c1}$.

As vaporized coolant from output ports of heat exchangers 140 and 145 is conveyed to input ports of condensers 150 and 155, the coolant undergoes a phase change from vapor to liquid as a result of heat transfer from the condensers to the surrounding liquid in which the reactor and the condenser are at least partially submerged. Accordingly, at a time $t_2$, a corresponding pressure within heat exchangers 140 and 145 as well as condensers 150 and 155 returns from $p_1$ to a level that approximates $p_0$. As further condensation of vaporized coolant occurs, a level of coolant present in heat exchangers 140 and 155 may increase from $L_{h1}$ to $L_{h2}$. In FIG. 2A, levels of liquid coolant within condensers 150 and 155, $L_{c2}$, are shown as being approximately equal to $L_{c1}$. However, in other implementations, $L_{c2}$ may represent a level greater than or less than $L_{c1}$.

Figure 3:
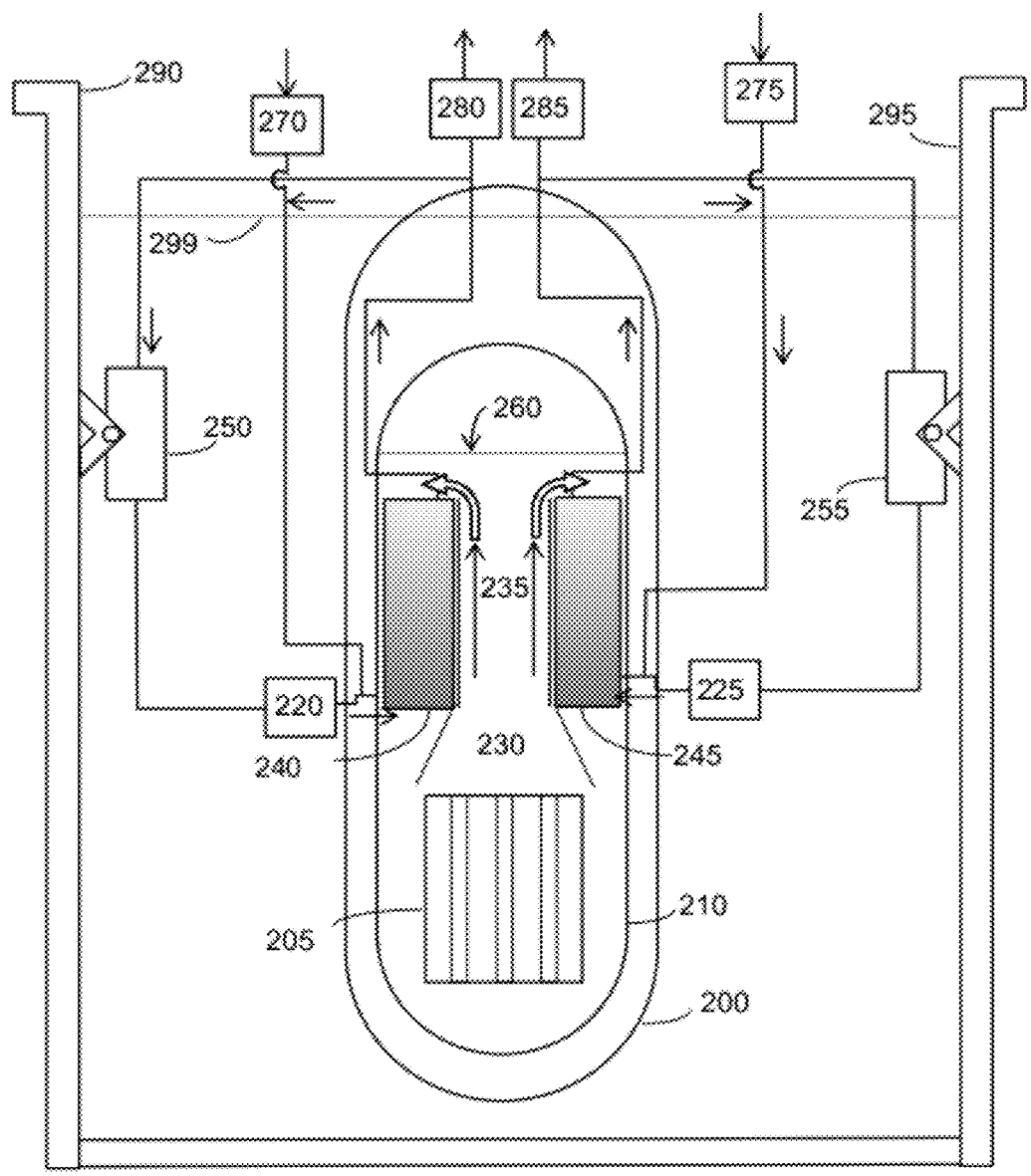
FIG. 3 is a diagram of a second example of a nuclear reactor and associated heat removal system.

FIG. 3 is a diagram of a second example of a nuclear reactor and associated heat removal system. In FIG. 3, containment vessel 200 surrounds reactor vessel 210, which includes reactor core 205. As heat within reactor core 205 is generated, liquid coolant, as shown by arrows 235 rises upward through channel 230 and over the upper portion of heat exchangers 240 and 245. As the coolant travels downward along the perimeter of reactor vessel 210, the coolant imparts heat on heat exchangers 240 and 245. For example, coolant within reactor vessel 210 is filled to level 260.

In an implementation, containment vessel 200 along with condensers 250 and 255 are partially submerged beneath waterline 299 within a reactor bay in which the condensers are structurally coupled to reactor bay walls 290 and 295. For example, during a cooling-related event, one or more of one or more of MFIVs 280 and 285 and/or MFIVs 270 and 275 adjust to block flow of coolant from heat exchangers 240 and 245. In addition, HRIVs 220 and 225 adjust to permit flow through condensers 250 and 255 to input ports of heat exchangers 240 and 245. However, it should be noted that one or more of MFIVs 280 and 285, MFIVs 270 and 275, and/or HRIVs 220 and 225 may adjust as a result of other conditions, and embodiments are not limited in this regard.

Figure 4:
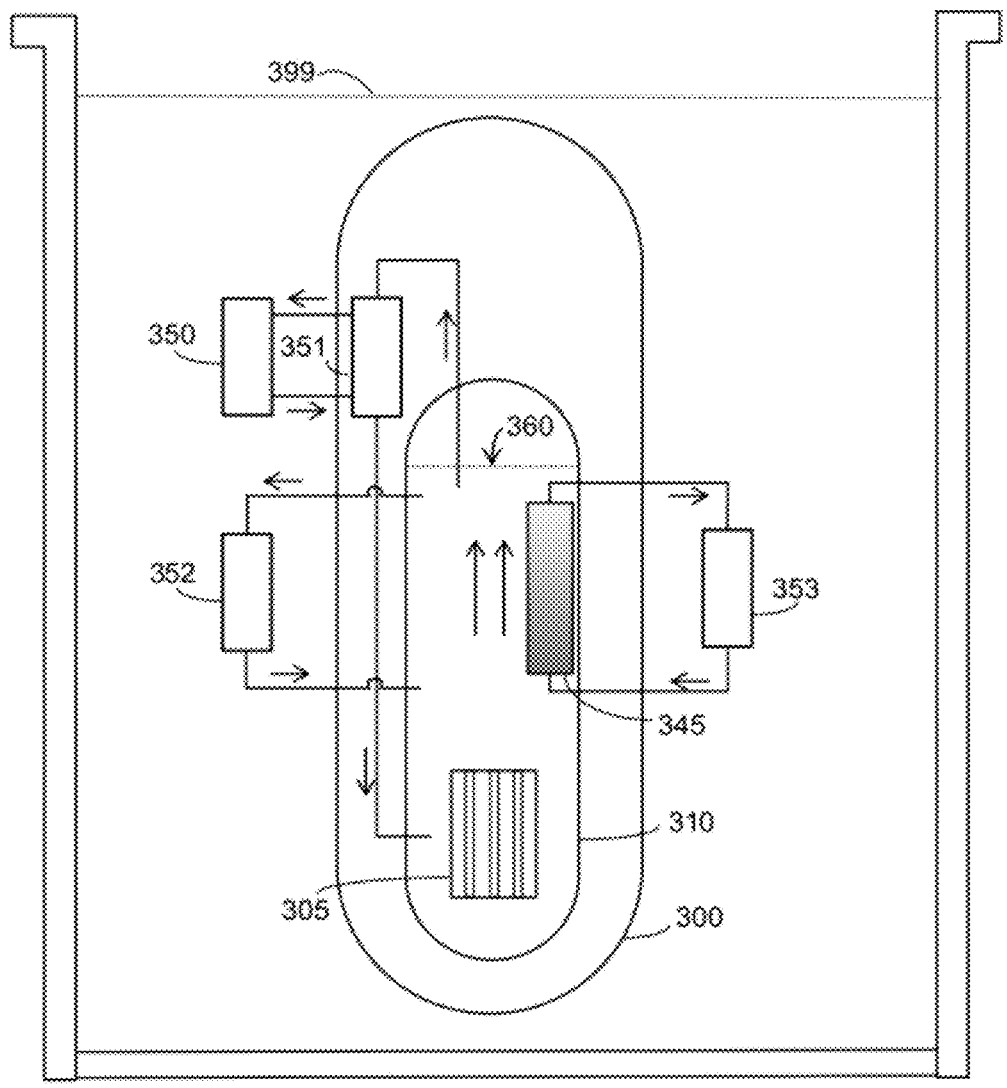
FIG. 4 is a diagram of a nuclear reactor employing several implementations of a heat removal system.

FIG. 4 is a diagram of a nuclear reactor employing several and perhaps separate implementations of a heat removal system. In FIG. 4, containment vessel 300 is much larger than reactor vessel 310. Reactor core 305 is shown as coming into contact with a coolant within reactor vessel 310, which rises as a result of heating by the reactor core. In a first example, condenser 351 is positioned between reactor vessel 310 and containment vessel 300 and draws coolant from a location below waterline 360. After passing through condenser 351, coolant is fed back into reactor vessel 310 at a location nearby reactor core 305, thereby providing a capability for removing heat from coolant from the primary loop within reactor vessel 310. In a secondary loop, condenser 350, at least partially submerged beneath waterline 399, is fluidically coupled to condenser 351 to provide a capability for removing heat from condenser 351.

In a second example, also shown in FIG. 4, an input port and an output port of condenser 352 interface directly with coolant within reactor vessel 310. In a third example, also shown in FIG. 4, condenser 352 is at least partially submerged along with containment vessel 300 within a common pool of liquid within a reactor bay. In another example, condenser 353 and containment vessel 300 are at least partially submerged beneath waterline 399 within a common pool of liquid. Condenser 353 receives coolant from heat exchanger 345 and provides coolant at a reduced temperature to the heat exchanger within reactor vessel 310.

Figure 5:
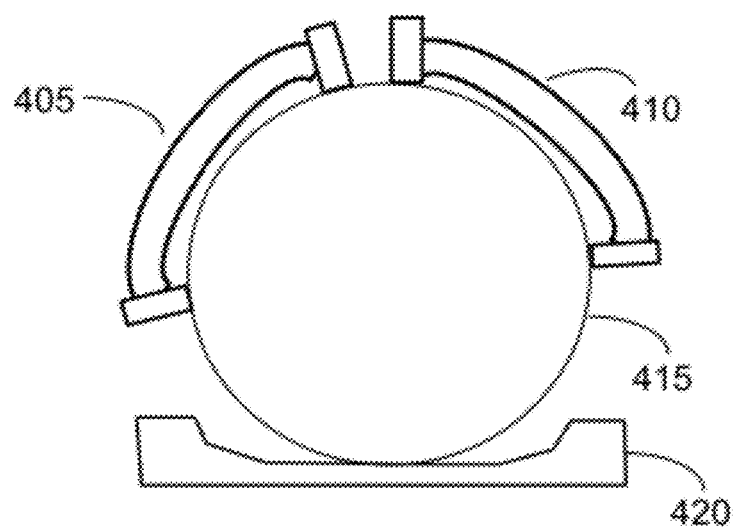
FIG. 5 is an end view of a containment vessel for a nuclear reactor resting on a service fixture.

FIG. 5 is an end view of a containment vessel for a nuclear reactor resting on a service fixture. In FIG. 5, containment vessel 415 is resting on a service fixture 420. Condensers 405 and 410 are both structurally coupled adjacent to each other at one side of the cylindrical-shaped or capsule-shaped containment vessel. By way of mounting the condensers to the containment vessel as a unitary structure, the entire structure can be removed from a water-filled reactor bay and placed on service fixture 420 for shipping, refueling, repair, and/or other maintenance.

While several examples have been illustrated and described, it will be understood by those skilled in the art that various other modifications may be made, and equivalents may be substituted, without departing from the scope of the following claims.

What is claimed is:

1. A nuclear reactor, comprising:
   a reactor vessel;
   a containment vessel that surrounds the reactor vessel;
   a first condenser that receives coolant from within the reactor vessel, the containment vessel and the first condenser at least partially submerged within a common pool; and
   a reactor bay separate from the containment vessel that surrounds the containment vessel, the reactor bay comprising a plurality of walls that at least partially define the common pool and enclose a coolant in the common pool between the containment vessel and the walls.

2. The nuclear reactor of claim 1, wherein the coolant enclosed in the common pool comprises a liquid coolant.

3. The nuclear reactor of claim 1, wherein the first condenser is structurally coupled to the containment vessel.

4. The nuclear reactor of claim 1, wherein a second condenser is structurally coupled adjacent the first condenser on a cylindrical portion of the containment vessel.

5. The nuclear reactor of claim 1, further comprising:
   a control device adjustable to permit coolant to flow from the first condenser to a first portion of a heat exchanger within the reactor vessel.

6. The nuclear reactor of claim 5, further comprising:
a second control device adjustable to permit coolant to flow from a second portion of the heat exchanger within the reactor vessel to the first condenser.

7. The nuclear reactor of claim 5, further comprising:
a degradation sensor responsive to degradation in a cooling system of the nuclear reactor,
the degradation sensor generating an output signal to an input port of the control device, and
the control device being adjustable to permit coolant to flow from the first condenser to the heat exchanger within the reactor vessel.

8. The nuclear reactor of claim 1, wherein the condenser is structurally coupled to an interior surface of a structure that defines, at least in part, the shape of the common pool.

9. The nuclear reactor of claim 1, further comprising:
a first conduit that fluidly couples the first condenser to the coolant within the reactor vessel near a reactor core that is arranged in a bottom half of the reactor vessel; and
a second conduit that fluidly couples the first condenser to the coolant within the reactor vessel near a fluidline of the coolant in a top half of the reactor vessel.

10. The nuclear reactor of claim 9, wherein the first condenser is positioned within the containment vessel external to the reactor vessel.

11. The nuclear reactor of claim 9, wherein the first conduit fluidly couples the first condenser to the coolant within the reactor vessel above the reactor core that is arranged in the bottom half of the reactor vessel.

12. The nuclear reactor of claim 11, wherein the first condenser is positioned in the common pool external to the containment vessel.

13. The nuclear reactor of claim 1, further comprising:
a first conduit that fluidly couples the first condenser directly to an inlet of a heat exchanger that is positioned within the reactor vessel adjacent a riser channel; and
a second conduit that fluidly couples the first condenser directly to an outlet of the heat exchanger.

14. A method of removing heat from a nuclear reactor, comprising:
sensing, prior to actuating a control device, a degradation in cooling capability of a nuclear reactor;
actuating the control device; and
conveying, responsive to actuation of the control device, vaporized coolant through a condenser, wherein
the condenser and a containment vessel of the nuclear reactor are at least partially submerged in a common pool, and wherein
the condenser and the containment vessel are in direct contact with liquid of the common pool.

15. The method of claim 14, wherein the conveying comprises:
conveying the vaporized coolant to the condenser, wherein the condenser is structurally coupled to the containment vessel.

16. The method of claim 14, wherein the conveying comprises fluidly coupling the vaporized coolant to a condenser structurally coupled to a surface of a structure that defines, at least in part, the shape of the common pool.

17. The method of claim 14, wherein the sensing results from, at least in part, one of the group consisting of: a loss of feedwater, a loss of off-site power, a failure within a coolant pump, a break in a conduit carrying feedwater, a loss of a feedwater heater, and any combination thereof.

18. A method of configuring a nuclear reactor and associated condenser for use, the method comprising:
coupling, structurally or fluidly, the condenser to the nuclear reactor that is housed in a containment vessel; and
at least partially submerging the condenser and the nuclear reactor into a common pool of liquid within a reactor bay, the common pool at least partially enclosed between a plurality of walls of the reactor bay and the containment vessel, wherein
the at least partially submerged condenser makes direct contact with liquid of the common pool.

19. The method of claim 18, wherein the coupling comprises:
affixing the condenser to the containment vessel that houses the nuclear reactor.

20. The method of claim 19, wherein the coupling further comprises:
fluidly coupling a coolant-carrying conduit to an input port of the condenser, wherein
the condenser is structurally coupled to a surface that defines, at least in part, the shape of the common pool of liquid.

21. A heat removal system, comprising:
a condenser operable to remove heat from a nuclear reactor, the condenser being at least partially submerged in a pool surrounding the nuclear reactor;
means for detecting a degradation in cooling capability of the nuclear reactor; and
means for controlling vaporized coolant flow to the condenser in response to an output signal from the means for detecting a degradation in cooling capability.

22. The heat removal system of claim 21, wherein the condenser is structurally coupled to a surface of a structure that defines, at least in part, the shape of the pool surrounding the nuclear reactor.

23. The heat removal system of claim 21, wherein the condenser is structurally coupled to a containment vessel housing the nuclear reactor.

24. The heat removal system of claim 23, wherein the condenser is structurally coupled to an outer surface of the containment vessel.

25. A nuclear reactor, comprising:
a reactor vessel;
a containment vessel that surrounds the reactor vessel;
a first condenser that receives coolant from within the reactor vessel, the containment vessel and the first condenser at least partially submerged within a common pool;
a control device adjustable to permit coolant to flow from the first condenser to a first portion of a heat exchanger within the reactor vessel; and
a degradation sensor responsive to degradation in a cooling system of the nuclear reactor, the degradation sensor operable to generate an output signal to an input port of the control device, and the control device adjustable to permit coolant to flow from the first condenser to the heat exchanger within the reactor vessel.

26. The nuclear reactor of claim 25, wherein the common pool comprises liquid coolant.

27. The nuclear reactor of claim 25, wherein the first condenser is structurally coupled to the containment vessel.

28. The nuclear reactor of claim 25, wherein a second condenser is structurally coupled adjacent the first condenser on a cylindrical portion of the containment vessel.

29. The nuclear reactor of claim 25, further comprising:
a control device adjustable to permit coolant to flow from the first condenser to a first portion of a heat exchanger within the reactor vessel.

30. The nuclear reactor of claim 29, further comprising:
a second control device adjustable to permit coolant to flow from a second portion of the heat exchanger within the reactor vessel to the first condenser.

31. The nuclear reactor of claim 25, wherein the condenser is structurally coupled to an interior surface of a structure that defines, at least in part, the shape of the common pool.

* * * * *